United States Patent
Yamaguchi

(10) Patent No.: US 12,555,482 B2
(45) Date of Patent: Feb. 17, 2026

(54) TRAVELING CONTROL APPARATUS

(71) Applicant: SUBARU CORPORATION, Tokyo (JP)

(72) Inventor: Fumihito Yamaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 199 days.

(21) Appl. No.: 18/544,230

(22) Filed: Dec. 18, 2023

(65) Prior Publication Data

US 2024/0221507 A1    Jul. 4, 2024

(30) Foreign Application Priority Data

Dec. 28, 2022 (JP) ................. 2022-211176

(51) Int. Cl.
| | |
|---|---|
| G08G 1/16 | (2006.01) |
| G08G 1/0967 | (2006.01) |
| H04B 17/318 | (2015.01) |
| H04W 4/44 | (2018.01) |
| H04W 36/30 | (2009.01) |

(52) U.S. Cl.
CPC ....... *G08G 1/167* (2013.01); *G08G 1/096725* (2013.01); *G08G 1/096775* (2013.01); *G08G 1/096783* (2013.01); *G08G 1/164* (2013.01); *H04B 17/328* (2023.05); *H04W 4/44* (2018.02); *H04W 36/30* (2013.01)

(58) Field of Classification Search
CPC ............ G08G 1/167; G08G 1/096725; G08G 1/096775; G08G 1/096783; G08G 1/164; H04B 17/328; H04W 4/44; H04W 36/30
See application file for complete search history.

(56) References Cited

U.S. PATENT DOCUMENTS

| | | | | |
|---|---|---|---|---|
| 7,877,187 B2* | 1/2011 | Hori | ........ | B60Q 1/525 340/436 |
| 8,145,368 B2* | 3/2012 | Won | ........ | G08G 1/01 701/119 |
| 8,788,134 B1* | 7/2014 | Litkouhi | ........ | B60W 30/16 701/23 |

(Continued)

FOREIGN PATENT DOCUMENTS

JP    2020-160885 A    10/2020

*Primary Examiner* — Dale W Hilgendorf
(74) *Attorney, Agent, or Firm* — Rimon P.C.

(57) ABSTRACT

A traveling control apparatus performs a traveling control allowing for merging on a first vehicle traveling on a first lane or a second vehicle traveling on a second lane by wireless communication in a merging section. The traveling control apparatus includes a communication reliability determination unit and a processor. The communication reliability determination unit determines respective communication reliabilities related to the first and the second vehicles. The processor performs the traveling control on the second vehicle when both the respective communication reliabilities related to the first and the second vehicles are higher than or equal to a predetermined reliability. The processor performs the traveling control on the first vehicle when the communication reliability related to the first vehicle is higher than or equal to the predetermined reliability and the communication reliability related to the second vehicle is lower than the predetermined reliability.

14 Claims, 9 Drawing Sheets

(56) References Cited

U.S. PATENT DOCUMENTS

| | | | |
|---|---|---|---|
| 10,081,357 B2* | 9/2018 | Saigusa | G08G 1/096791 |
| 11,117,584 B2* | 9/2021 | D'sa | B60W 30/0956 |
| 11,572,099 B2* | 2/2023 | D'sa | B60W 30/16 |
| 11,590,979 B2* | 2/2023 | Yoda | B60W 30/18163 |
| 11,597,396 B2* | 3/2023 | Sugiura | B60W 30/18163 |
| 11,614,739 B2* | 3/2023 | Das Gupta | G05D 1/0214 |
| | | | 701/23 |
| 11,834,047 B2* | 12/2023 | Hashimoto | B60W 30/18163 |
| 11,987,237 B2* | 5/2024 | Abad | B60W 30/09 |
| 12,145,590 B2* | 11/2024 | Miike | B60W 30/10 |
| 2007/0142995 A1* | 6/2007 | Wotlermann | B60K 31/0008 |
| | | | 701/96 |
| 2017/0369067 A1* | 12/2017 | Saigusa | B60W 30/16 |
| 2020/0307600 A1* | 10/2020 | Sato | G08G 1/167 |
| 2022/0295336 A1* | 9/2022 | Rao | H04W 4/44 |

\* cited by examiner

TRAVELING CONTROL APPARATUS

CROSS-REFERENCE TO RELATED APPLICATIONS

The present application claims priority from Japanese Patent Application No. 2022-211176 filed on Dec. 28, 2022, the entire contents of which are hereby incorporated by reference.

BACKGROUND

The disclosure relates to a traveling control apparatus.

In the field of vehicles, a development on what is called a connected car has been rapidly advanced.

In addition, various techniques for a reduction in a load of a driver or for safe driving assistance have been put into practical use. Non-limiting examples of such techniques may include an adaptive cruise control system (ACCS) and a lane keeping assistance system (LKAS). This has led to higher anticipation of an advanced driving assistance system or an advanced automated driving system combined with the above-described connected technique.

Such a system merging a traveling control technique and a communication technique has an issue regarding how to deal with a situation where communication is disconnected by a cause such as a malfunction in communication.

For example, when communication with one vehicle is disconnected in a merging section in which traveling lanes are merged, what kind of traveling control is to be executed may be an issue. The traveling control to be executed may also include a control of another vehicle.

To address the above-described issue, there is disclosed a technique regarding a traveling control apparatus for a vehicle. The traveling control apparatus generates a target path to a predetermined range as a target and performs automated lane change to a neighboring lane when no other vehicle is recognized in the predetermined range of the neighboring lane by a surrounding recognition operation. The traveling control apparatus performs a merging support operation. In the merging support operation, the traveling control apparatus generates a target path using other vehicle information obtained by a communication operation, and performs an acceleration/deceleration control and a steering control to allow for automated merging into a merging target lane. When a malfunction occurs in the communication operation during the automated merging, the driving control apparatus alters an override threshold value to a value greater than that in the normal communication operation. The override threshold value serves as a determination criterion for operation intervention to stop the acceleration/deceleration control and the steering control. For example, reference is made to Japanese Unexamined Patent Application Publication (JP-A) No. 2020-160885.

SUMMARY

An aspect of the disclosure provides a traveling control apparatus configured to perform a traveling control on a first vehicle or a second vehicle by wireless communication in a merging section in which a second lane merges into a first lane. The traveling control allows for merging. The first vehicle travels on the first lane. The second vehicle travels on the second lane. The second lane has a lower traveling priority than the first lane. The traveling control apparatus includes a communication reliability determination unit and a processor. The communication reliability determination unit is configured to determine a communication reliability related to the first vehicle and a communication reliability related to the second vehicle. The communication reliability related to the first vehicle is the communication reliability of the wireless communication between the first vehicle and the traveling control apparatus. The communication reliability related to the second vehicle is the communication reliability of the wireless communication between the second vehicle and the traveling control apparatus. The processor is configured to perform the traveling control on the second vehicle when both the communication reliability related to the first vehicle and the communication reliability related to the second vehicle are higher than or equal to a predetermined reliability. The processor is configured to perform the traveling control on the first vehicle when the communication reliability related to the first vehicle is higher than or equal to the predetermined reliability and the communication reliability related to the second vehicle is lower than the predetermined reliability.

An aspect of the disclosure provides a traveling control apparatus configured to perform a traveling control on a first vehicle or a second vehicle by wireless communication in a merging section in which a second lane merges into a first lane. The traveling control allows for merging. The first vehicle travels on the first lane. The second vehicle travels on the second lane. The second lane has a lower traveling priority than the first lane. The traveling control apparatus includes a communication reliability determination unit and a processor. The communication reliability determination unit is configured to determine a communication reliability related to the first vehicle and a communication reliability related to the second vehicle. The communication reliability related to the first vehicle is the communication reliability of the wireless communication between the first vehicle and the traveling control apparatus. The communication reliability related to the second vehicle is the communication reliability of the wireless communication between the second vehicle and the traveling control apparatus. The processor is configured to perform the traveling control on one of the first vehicle and the second vehicle that is higher in the communication reliability.

An aspect of the disclosure provides a traveling control apparatus configured to perform a traveling control on a first vehicle or a second vehicle by wireless communication in a merging section in which a second lane merges into a first lane. The traveling control allows for merging. The first vehicle travels on the first lane. The second vehicle travels on the second lane. The second lane has a lower traveling priority than the first lane. The traveling control apparatus includes circuitry. The circuitry is configured to determine a communication reliability related to the first vehicle and a communication reliability related to the second vehicle. The communication reliability related to the first vehicle is the communication reliability of the wireless communication between the first vehicle and the traveling control apparatus. The communication reliability related to the second vehicle is the communication reliability of the wireless communication between the second vehicle and the traveling control apparatus. The circuitry is configured to perform the traveling control on the second vehicle when both the communication reliability related to the first vehicle and the communication reliability related to the second vehicle are higher than or equal to a predetermined reliability, and perform the traveling control on the first vehicle when the communication reliability related to the first vehicle is higher than or equal to the predetermined reliability and the communication reliability related to the second vehicle is lower than the predetermined reliability.

An aspect of the disclosure provides a traveling control apparatus configured to perform a traveling control on a first vehicle or a second vehicle by wireless communication in a merging section in which a second lane merges into a first lane. The traveling control allows for merging. The first vehicle travels on the first lane. The second vehicle travels on the second lane. The second lane has a lower traveling priority than the first lane. The traveling control apparatus includes circuitry. The circuitry is configured to determine a communication reliability related to the first vehicle and a communication reliability related to the second vehicle. The communication reliability related to the first vehicle is the communication reliability of the wireless communication between the first vehicle and the traveling control apparatus. The communication reliability related to the second vehicle is the communication reliability of the wireless communication between the second vehicle and the traveling control apparatus. The circuitry is configured to perform the traveling control on one of the first vehicle and the second vehicle that is higher in the communication reliability.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
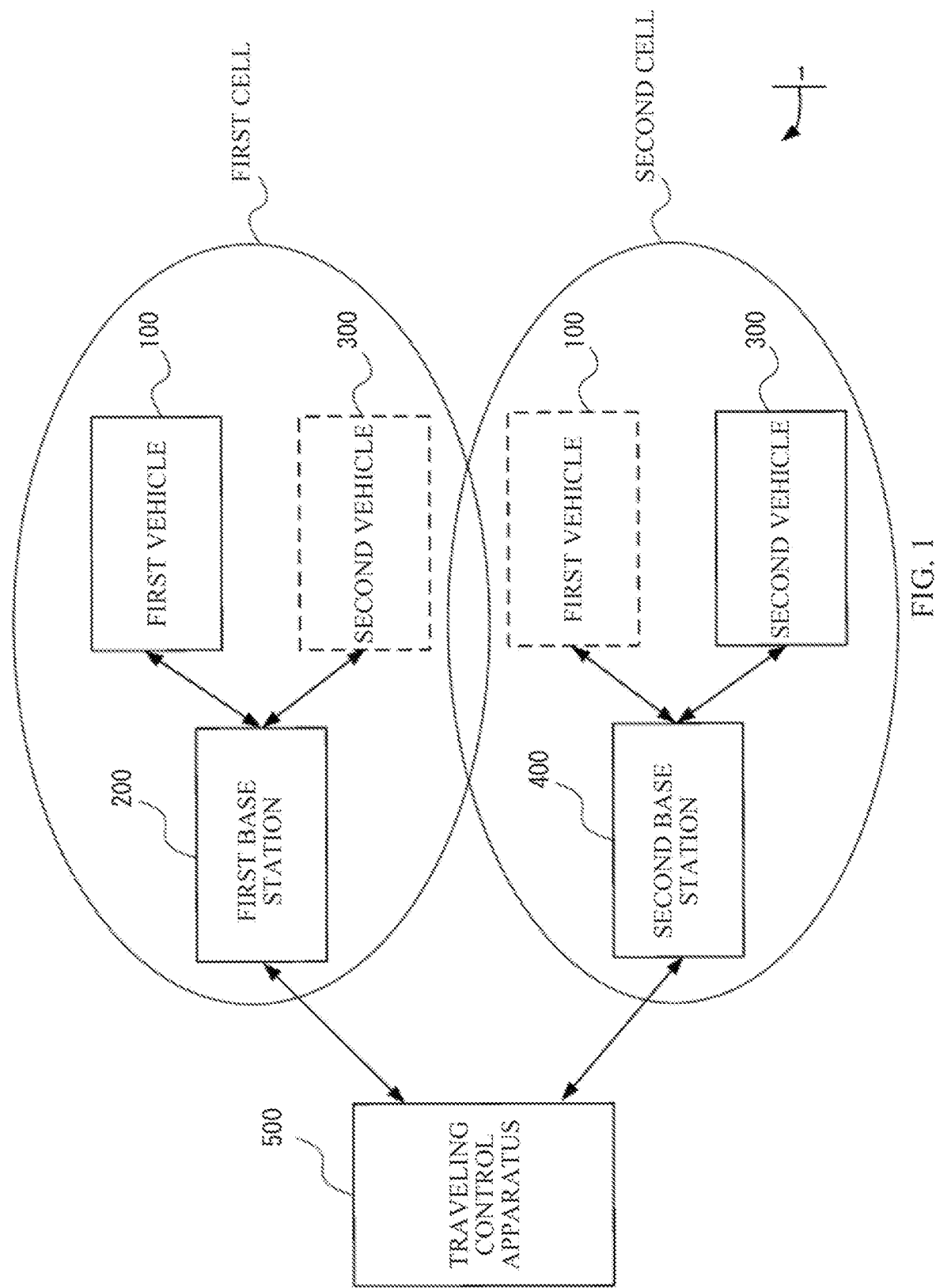
FIG. 1 is a diagram illustrating a configuration of a traveling control system according to one example embodiment of the disclosure.

A technique disclosed in JP-A No. 2020-160885 may be used based on the assumption that a vehicle is configured to perform an override operation. The override operation may allow for switching to manual driving in response to operation intervention by a driver who drives the vehicle. When a malfunction occurs in a communication operation during automated merging, an override threshold value serving as a determination criterion of operation intervention, which is to stop an acceleration/deceleration control and a steering control, is altered to a value greater than that in the normal communication operation. This is to prevent the vehicle from deviating from a traveling lane or coming closer to another vehicle. The vehicle can deviate from the traveling lane or can come closer to the other vehicle due to excessive operation intervention performed when the malfunction occurs in the communication operation while merging assistance is performed. The above-described technique is not to continue, also when the communication is in a deteriorated state, a driving assistance control or an automated driving control in which operation intervention by the driver is not performed.

It is desirable to provide a traveling control apparatus configured to execute an appropriate traveling control also in a situation where communication quality is deteriorated.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

A traveling control apparatus according to an example embodiment of the disclosure will be described with reference to FIGS. 1 to 9.

Note that in the following, the traveling control apparatus according to the example embodiment will be described, referring to a traveling control system illustrated in FIG. 1 as an example.

[Configuration of Traveling Control System 1]

Referring to FIG. 1, the traveling control system 1 according to the example embodiment may include a first vehicle 100, a first base station 200, a second vehicle 300, a second base station 400, and a traveling control apparatus 500.

Note that the traveling control system 1 according to the example embodiment may include a plurality of base stations and a plurality of vehicles; however, for illustration purpose, two base stations and two vehicles are illustrated in FIG. 1, although the number of base stations and the number of vehicles are not limited to those in the drawings.

The first vehicle 100 and the second vehicle 300 may each be, for example, a connected car. The first vehicle 100 and the second vehicle 300 may each execute traveling based on automated driving, based on information obtained from, for example, a sensor mounted on corresponding one of the first vehicle 100 and the second vehicle 300 and information obtained by, for example, communication.

Figure 5:
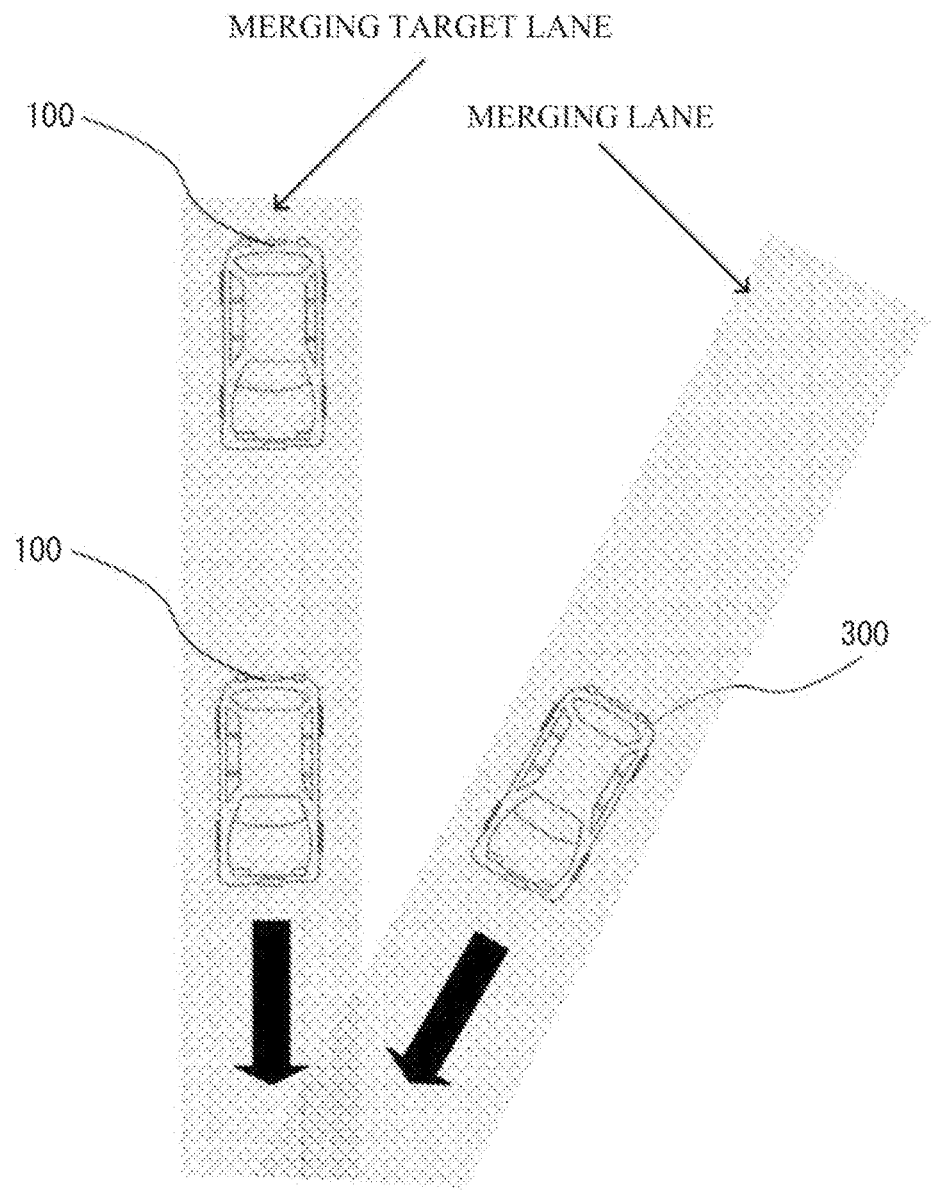
FIG. 5 is a diagram illustrating an example of a relationship between the first vehicle and a second vehicle in a merging section according to the example embodiment of the disclosure.

Note that the following description is provided based on the assumption that a vehicle (a main lane traveling vehicle) traveling on a lane into which another lane merges is the first vehicle 100, and a vehicle (a merging vehicle) traveling on a merging lane is the second vehicle 300, as illustrated in FIG. 5.

The first base station 200 and the second base station 400 may each be, for example, a fixed or mobile radio station established on land and may communicate with a terminal. The first base station 200 and the second base station 400 may each perform wireless communication with the terminal while serving as a terminal of a telephone network.

The first base station 200 and the second base station 400 may be coupled to each other, for example, by a wire (e.g., a telephone line), wirelessly, or by a satellite line.

The first base station 200 and the second base station 400 may each perform wireless communication with a vehicle present in a corresponding communication area. The communication area of the first base station 200 may be a first cell illustrated in FIG. 1, and the communication area of the second base station 400 may be a second cell illustrated in FIG. 1. Based on a movement of the vehicle, handover may be performed in the traveling control system 1. The handover may involve switching of a base station with which the vehicle performs the wireless communication.

The traveling control apparatus 500 performs, by wireless communication, a traveling control on the first vehicle 100 or the second vehicle 300 in a merging section in which a second lane (a merging lane) merges into a first lane (main lane). The traveling control allows for merging. The first vehicle 100 travels on the first lane. The second vehicle 300 travels on the second lane. The second lane has a lower traveling priority than the first lane.

The traveling control apparatus 500 may execute a traffic control or a remote control of traveling based on the automated driving or traveling based on driving assistance of the first vehicle 100 and the second vehicle 300.

The traveling control apparatus 500 may determine a first communication reliability related to the first vehicle 100 and a second reliability related to the second vehicle 300. The first communication reliability may be a communication reliability of communication via the first base station 200 with which the first vehicle 100 establishes communication connection. The second communication reliability may be a communication reliability of communication via the second base station 400 with which the second vehicle 300 establishes communication connection. The traveling control apparatus 500 may execute a deceleration control on one of the first vehicle 100 and the second vehicle 300 that is higher in communication reliability before the merging section.

In a wireless network environment, communication may be established by an "intensity of a radio wave" and a "quality of data superimposed on the radio wave" between the base station and the communication terminal. The "intensity of a radio wave" may refer to Received Signal Strength Indicator (RSSI). The "quality of data superimposed on the radio wave" may refer to Reference Signal Received Quality (RSRQ).

Regarding the "intensity of the radio wave" (RSSI), the level of the radio wave can attenuate and decrease, for example, due to an influence of a distance between the first base station 200 and a communicator (e.g., the communication terminal) of the first vehicle 100 or between the second base station 400 and a communicator (e.g., the communication terminal) of the second vehicle 300, or an obstacle.

Regarding the "quality of data superimposed on the radio wave" (RSRQ), the quality of the data can deteriorate, for example, due to a radio interference caused by many radio waves derived from another communication, or an environmental noise.

As described above, unstable communication due to a decrease in the "intensity of the radio wave" (RSSI) or the "quality of data superimposed on the radio wave" (RSRQ) can cause a malfunction such as a communication interruption or communication delay.

In addition to or instead of the above, Bit Error Rate (BER), Packet Error Rate (PER), and/or a quality of demodulated data (a part of a communication protocol) having been processed by a Radio Frequency (RF) unit that handles a high-frequency band also influence the communication.

This may be referred to as a state in which communication quality is deteriorated.

In the example embodiment, a "communication reliability" may be used as an index of the communication quality. The "communication reliability" may be determined based on frequency of regular reception of information from corresponding one of the first vehicle 100 and the second vehicle 300.

[Configuration of Vehicle]

Because the first vehicle 100 and the second vehicle 300 may have configurations similar to each other, the following description mainly refers to the first vehicle 100.

Figure 2:
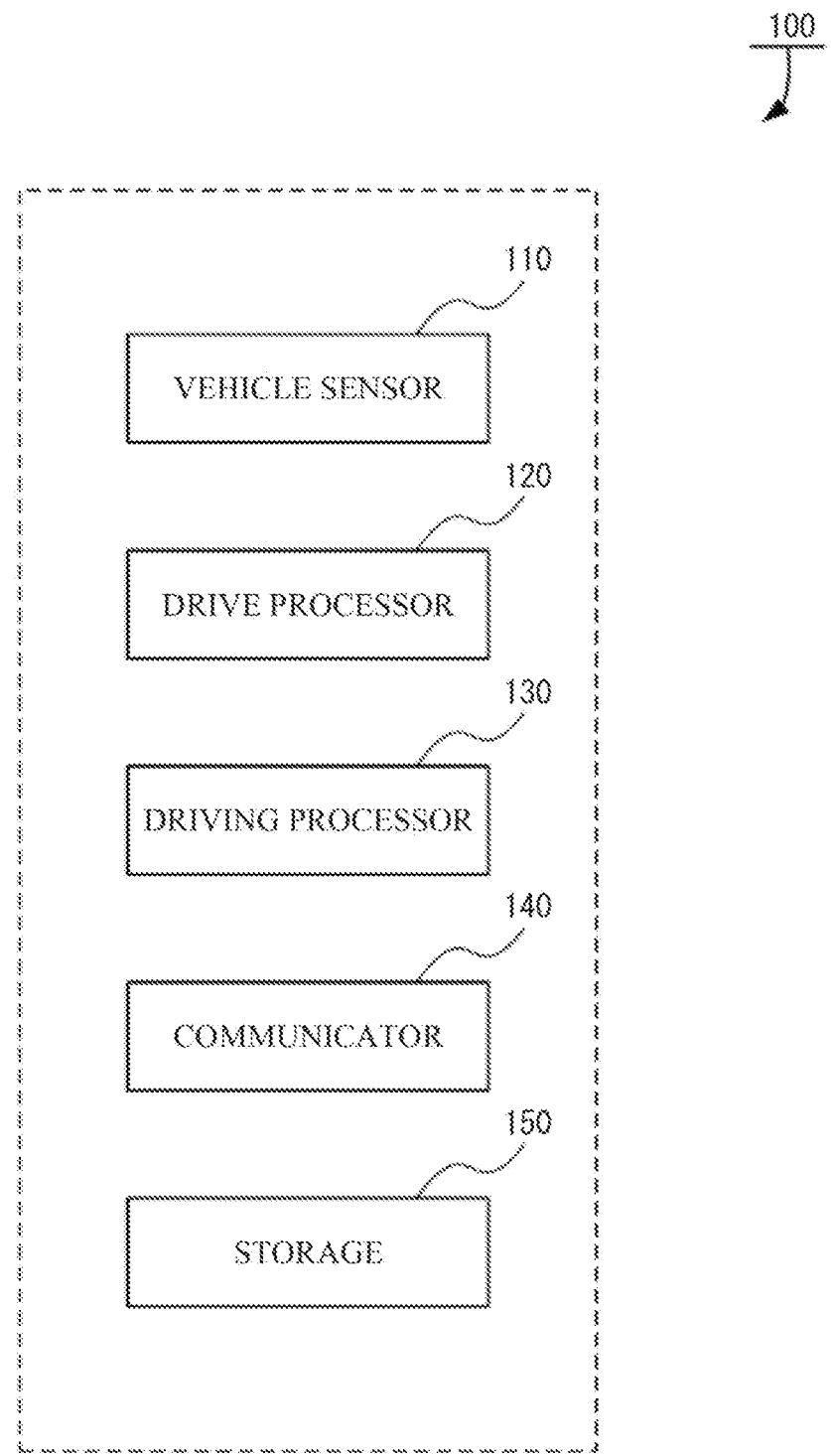
FIG. 2 is a diagram illustrating a configuration of a first vehicle according to the example embodiment of the disclosure.

Referring to FIG. 2, the first vehicle 100 according to the example embodiment may include a vehicle sensor 110, a drive processor 120, a driving processor 130, a communicator 140, and a storage 150.

The vehicle sensor 110 may include a sensor that detects information on a traveling state of the first vehicle 100, such as a vehicle speed sensor.

The vehicle speed sensor may include, for example, a wheel speed sensor attached to each wheel and a speed calculator. The vehicle speed sensor may integrate wheel speeds detected by the wheel speed sensors to derive a speed (a vehicle speed) of the first vehicle 100, and output the derived vehicle speed to the drive processor 120.

Non-limiting examples of the sensor that detects information regarding a traveling state of the first vehicle 100 may include: a position sensor that detects, for example, a position of the first vehicle 100; a vehicle speed sensor that detects a speed of the first vehicle 100; an acceleration sensor that detects an acceleration rate; a yaw rate sensor that detects an angular velocity around a vertical axis; and an azimuth sensor that detects an orientation of the first vehicle 100.

The position sensor may detect the position of the first vehicle 100 by, for example, a global positioning system (GPS) device. Alternatively, the position sensor may detect the position of the first vehicle 100 by, for example, a global navigation satellite system (GNSS) receiver included in a navigation device.

The vehicle sensor 110 may include, for example, a camera, a radar device, a light detection and ranging (LIDAR), and an object recognition device.

These devices may serve as, for example, components that detect surrounding information related to the first vehicle 100.

The camera may be, for example, a digital camera using a solid-state imaging device such as a charge coupled device (CCD) or a complementary metal oxide semiconductor (CMOS), and may be a stereo camera.

The radar device may radiate a radio wave such as a millimeter wave to a surrounding region of the first vehicle 100 and detect a radio wave (e.g., a reflected wave) reflected by a surrounding object to detect at least a position (a distance and an azimuth) of the object.

The radar device may be mounted at any location in the first vehicle 100 and may detect a position and a speed of an object by a method such as a frequency modulated continuous wave (FM-CW), for example.

The LIDAR may irradiate the surrounding region of the first vehicle 100 with an electromagnetic wave having a wavelength close to that of light, and measure scattered light.

The LIDAR may detect a distance to an object, based on the time from emission of light to reception of the light.

The light to be emitted by the LIDAR may be, for example, pulsed laser light.

The object recognition device may recognize, for example, a position, a type, and a speed of an object present in the surrounding region of the first vehicle 100 by performing a sensor fusion process on a detection result based on one or two or all of the camera, the radar device, and the LIDAR described above.

The object recognition device may output a recognition result to the driving processor 130.

The drive processor 120 may apply, for example, driving force to the first vehicle 100 to cause the first vehicle 100 to travel.

The drive processor 120 may include, for example: a traveling driving force output unit that outputs, to drive wheels, traveling driving force (e.g., torque) that causes the first vehicle 100 to travel; a brake unit that outputs brake torque corresponding to a predetermined braking operation to each wheel; and a steering unit that changes a direction of steered wheels.

The traveling driving force output unit may include a combination of, for example, an internal combustion engine, an electric motor, and a transmission, and an electronic control unit (ECU) that controls, for example, the internal combustion engine, the electric motor, and the transmission.

The traveling driving force output unit may control, for example, the internal combustion engine, the electric motor, and the transmission, based on information inputted from the driving processor 130 which will be described later.

The brake unit may include, for example, a brake caliper, a cylinder that transmits a hydraulic pressure to the brake caliper, an electric motor that generates the hydraulic pressure in the cylinder, and a brake ECU.

The brake ECU may control the electric motor, based on information inputted from the driving processor 130, and output brake torque corresponding to a braking control to each wheel.

The steering unit may include, for example, a steering ECU and an electric motor.

The electric motor may apply, for example, force to a rack and pinion mechanism to change the direction of the steered wheels.

The steering ECU may drive the electric motor to change the direction of the steered wheels, based on information inputted from the driving processor 130.

The driving processor 130 may execute, for example, an automated driving control or a driving assistance control of the first vehicle 100.

The driving processor 130 may execute the automated driving control or the driving assistance control by generating driving control information corresponding to: a surrounding state of the first vehicle 100 detected by the vehicle sensor 110; behavior of the first vehicle 100; control instructions received from an occupant; and control information received from the later-described traveling control apparatus 500 acquired via the first base station 200 or the second base station 400 by communication, and by outputting the thus-generated driving control information to the drive processor 120.

The communicator 140 may be a wireless communication interface that performs wireless communication with, for example, the first vehicle 100, the first base station 200, and the traveling control apparatus 500.

The communicator 140 may correspond to multiple wireless access schemes, and may include, for example, a reception processing unit, a transmission processing unit, and an antenna which are not illustrated.

The storage 150 may include, for example, a hard disk drive (HDD), a flash memory, an electrically erasable and programmable read-only memory (EEPROM), a read-only memory (ROM), and a random-access memory (RAM). The storage 150 may contain, for example, a communication requirement, a control program to be read and executed by a processor, and various other pieces of information.

[Configuration of Base Station]

Because the first base station 200 and the second base station 400 may have configurations similar to each other, the following description mainly refers to the first base station 200.

Figure 3:
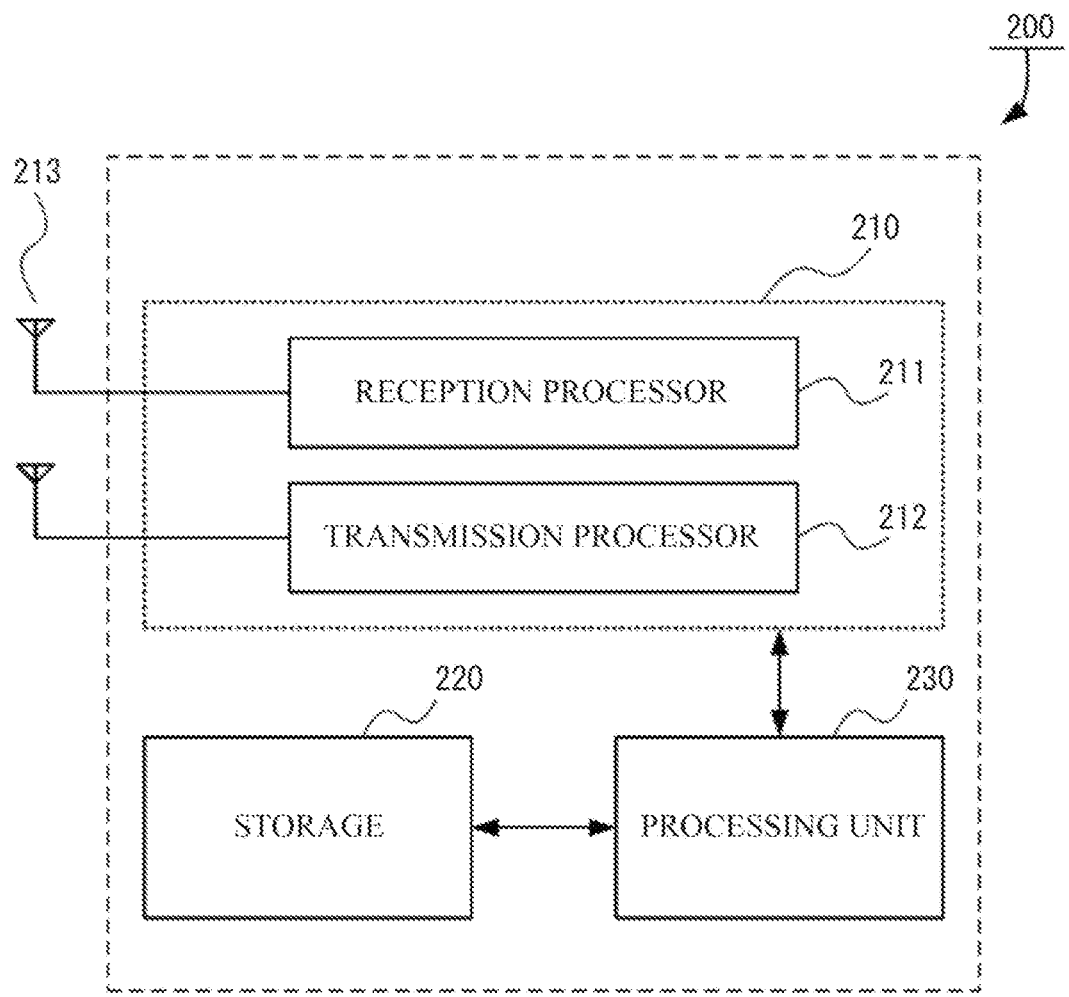
FIG. 3 is a diagram illustrating a configuration of a first base station according to the example embodiment of the disclosure.

Referring to FIG. 3, the first base station 200 according to the example embodiment may include a wireless communicator 210, a storage 220, and a processing unit 230.

The wireless communicator 210 may be a wireless communication interface that performs wireless communication with, for example, the first vehicle 100 and the traveling control apparatus 500.

The wireless communicator 210 may include a reception processor 211, a transmission processor 212, and an antenna 213.

The reception processor 211 may process an uplink signal received via the antenna 213, and may include a wireless reception unit, a demultiplexing unit, a demodulation unit, and a decoding unit which are not illustrated.

The wireless reception unit may perform, on the uplink signal, a down-conversion, a removal of unnecessary frequency components, a control of an amplification level, a quadrature demodulation, a conversion into a digital signal, a removal of a guard interval, an extraction of a frequency domain signal by fast Fourier transform, for example.

The demultiplexing unit may demultiplex an uplink channel such as a physical uplink shared channel (PUSCH) or a physical uplink control channel (PUCCH) and an uplink reference signal from a signal outputted from the wireless reception unit.

The demodulation unit may perform demodulation of a received signal, based on a modulation method such as binary phase-shift keying (BPSK) or quaternary phase-shift keying (QPSK) on a modulation symbol of the uplink channel.

The decoding unit may perform a decoding process on coded bits of the demodulated uplink channel.

The transmission processor 212 may perform a transmission process of downlink control information and downlink data via the antenna 213, and may include a coding unit, a modulation unit, a multiplexing unit, and a wireless transmission unit which are not illustrated.

The encoding unit may encode the downlink control information and the downlink data received from the later-described processing unit 230, based on an encoding method such as block encoding, convolutional encoding, or turbo encoding.

The modulation unit may modulate encoded bits outputted from the encoding unit by a predetermined modulation method such as BPSK, QPSK, 16 quadrature amplitude modulation (16QAM), 64QAM, or 256QAM.

The multiplexing unit may multiplex modulation symbols of each channel and a downlink reference signal, and may arrange them in a predetermined resource element.

The wireless transmission unit may perform various signal processes on a signal from the multiplexing unit.

For example, the wireless transmission unit may perform a process such as a conversion into a time domain by fast Fourier transform, an addition of a guard interval, a generation of a baseband digital signal, a conversion into an analog signal, a quadrature modulation, an up-conversion, a removal of an extra frequency component, or an amplification of power.

The storage 220 may include a data-readable/writable storage device such as a dynamic random access memory (DRAM), a static random access memory (SRAM), a flash memory, or a hard disk.

The processing unit 230 may be a controller that controls each unit of the first base station 200 or the second base station 400.

The processing unit 230 may include a processor such as a central processing unit (CPU) or a micro processing unit (MPU).

The processing unit 230 may cause the processor to execute, for example, various programs stored in the storage 220 inside the first base station 200 or the second base station 400, based on a RAM as a working area.

[Configuration of Traveling Control Apparatus 500]

Figure 4:
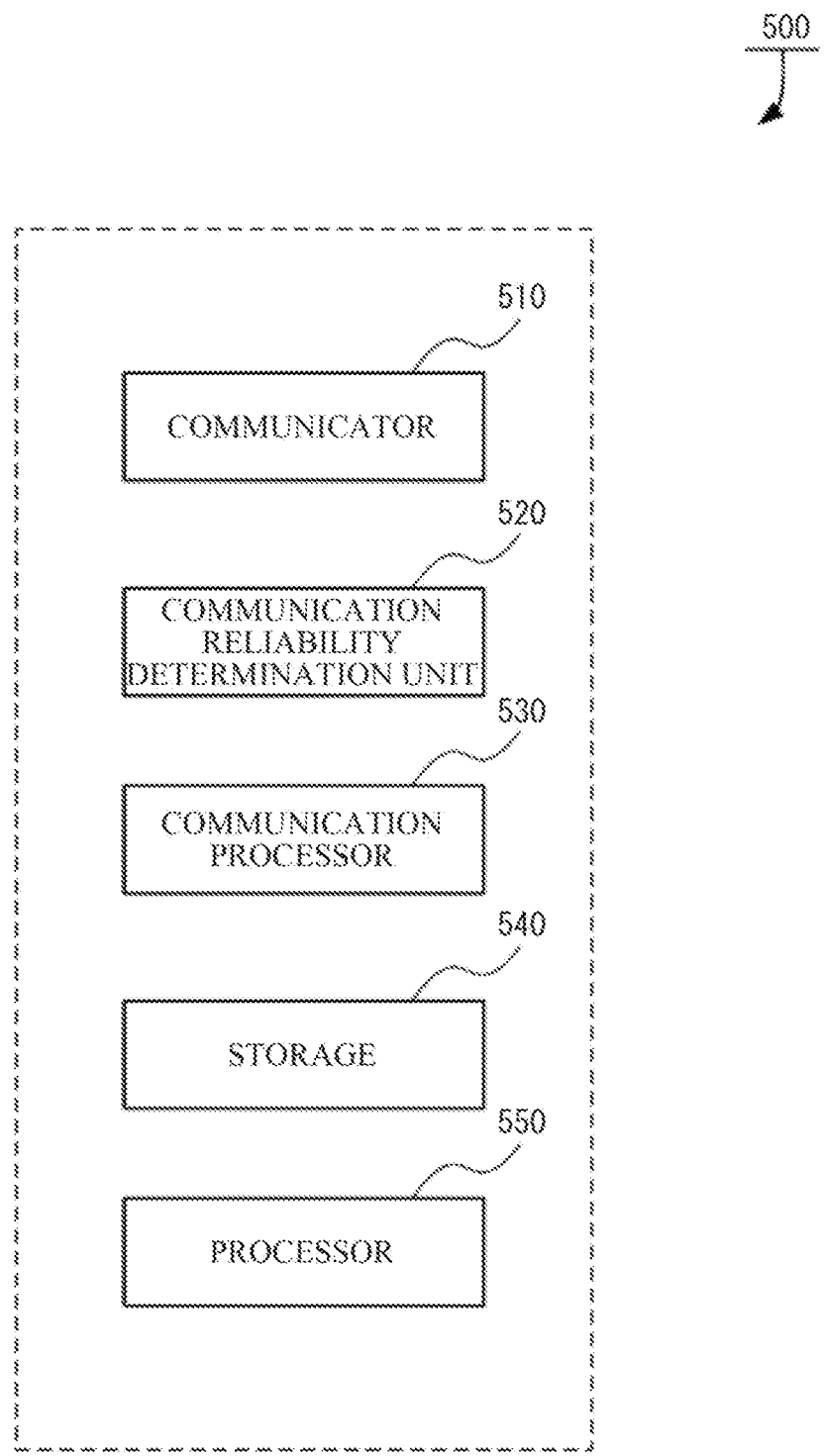
FIG. 4 is a diagram illustrating a configuration of a traveling control apparatus according to the example embodiment of the disclosure.

Referring to FIG. 4, the traveling control apparatus 500 according to the example embodiment may include a communicator 510, a communication reliability determination unit 520, a communication processor 530, a storage 540, and a processor 550.

The communicator 510 may execute wireless communication with the first base station 200 and the second base station 400, based on, for example, a cellular network in which a 4G or 5G communication scheme is available.

The communication reliability determination unit 520 may determine the first communication reliability related to the first vehicle 100 and the second communication reliability related to the second vehicle 300. The first communication reliability may be the reliability of the communication via the first base station 200 with which the first vehicle 100 establishes communication connection. The second communication reliability may be the reliability of the communication via the second base station 400 with which the second vehicle 300 establishes communication connection.

For example, the communication reliability determination unit 520 may determine the first communication reliability related to the first vehicle 100 based on reception frequency at which the communicator 510 regularly receives information from the first vehicle 100. The communication reliability determination unit 520 may determine the second communication reliability related to the second vehicle 300 based on reception frequency at which the communicator 510 regularly receives information from the second vehicle 300.

The communication reliability determination unit 520 may determine the "reception frequency" based on the number of pieces of information that the communicator 510 receives from corresponding one of the first vehicle 100 and the second vehicle 300 in a predetermined period.

The wireless communication may be performed via a plurality of base stations. Therefore, when the wireless communication is disconnected for a period of time longer than a period of time for handover from one of the base stations to another of the base stations, the communication reliability determination unit 520 may determine that the communication reliability is lower than a predetermined reliability.

The communication processor 530 may perform various controls to transmit various kinds of information to any of the first base station 200 and the second base station 400.

The storage 540 may include, for example, an HDD, a flash memory, an EEPROM, a ROM, or a RAM.

The storage 540 may contain, for example, a communication requirement, a program to be read and executed by a processor, and various other pieces of information.

In addition, the storage 540 may contain information regarding a base station including, without limitation, map information and a base station number.

The processor 550 may control an overall operation of the traveling control apparatus 500 based on a control program stored in a device such as the ROM in the storage 540.

In the example embodiment, the processor 550 may determine whether the first vehicle 100 and the second vehicle 300 interfere with each other at a merging point, for example, whether the first vehicle 100 and the second vehicle 300 come into contact with each other at the merging point, or whether the first vehicle 100 and the second vehicle 300 come close to each other to an extent that makes occupants of the first vehicle 100 and the second vehicle 300 worried.

Such a determination may be performed based on respective speeds of the first vehicle 100 and the second vehicle 300, respective acceleration rates of the first vehicle 100 and the second vehicle 300, a distance from the first vehicle 100 to the merging point, and a distance from the second vehicle 300 to the merging point.

When both the communication reliability related to the first vehicle 100 and the communication reliability related to the second vehicle 300 are higher than or equal to a predetermined reliability, the processor 550 may execute the traveling control on the second vehicle 300. When the communication reliability related to the first vehicle 100 is higher than or equal to the predetermined reliability, and the communication reliability related to the second vehicle 300 is lower than the predetermined reliability, the processor 550 may execute the traveling control on the first vehicle 100.

When both the communication reliability related to the first vehicle 100 and the communication reliability related to the second vehicle 300 are lower than the predetermined reliability, the processor 550 may execute the traveling control on one of the first vehicle 100 and the second vehicle 300 that is higher in the communication reliability.

The processor 550 may execute the traveling control on one of the first vehicle 100 and the second vehicle 300 that is higher in the communication reliability.

When there is a possibility that the first vehicle 100 and the second vehicle 300 interfere with each other at the merging point, the processor 550 may execute, on the first vehicle 100 or the second vehicle 300, an acceleration suppression control or a deceleration control as the traveling control to prevent the first vehicle 100 and the second vehicle 300 from interfering with each other.

Figure 6:
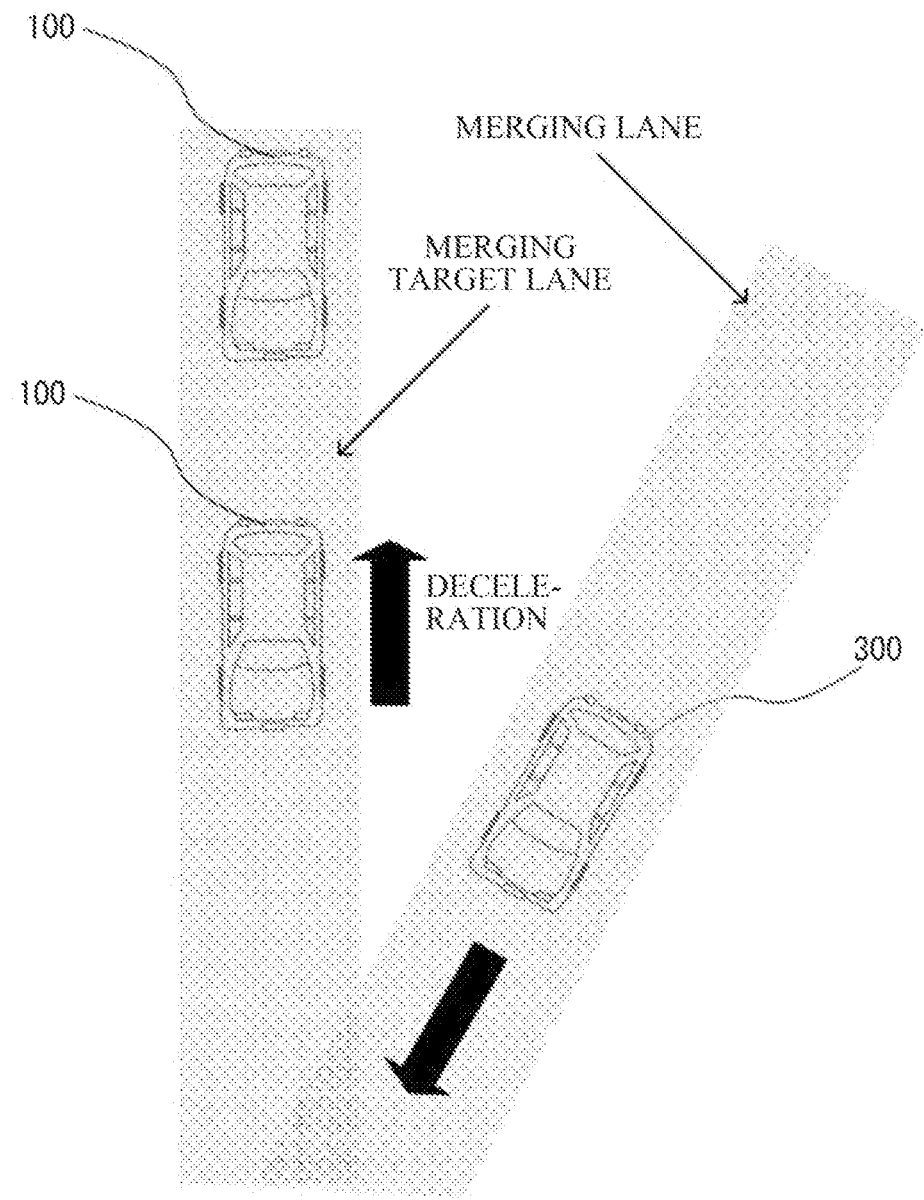
FIG. 6 is a diagram illustrating another example of the relationship between the first vehicle and the second vehicle in the merging section according to the example embodiment of the disclosure.

For example, when the communication reliability determination unit 520 determines that the communication reliability related to the first vehicle 100 is high and the communication reliability related to the second vehicle 300 is low, the processor 550 may send a control signal indicating deceleration to the driving processor 130 of the first vehicle 100 via the communicator 510, regardless of the traveling priority, as illustrated in FIG. 6.

Figure 7:
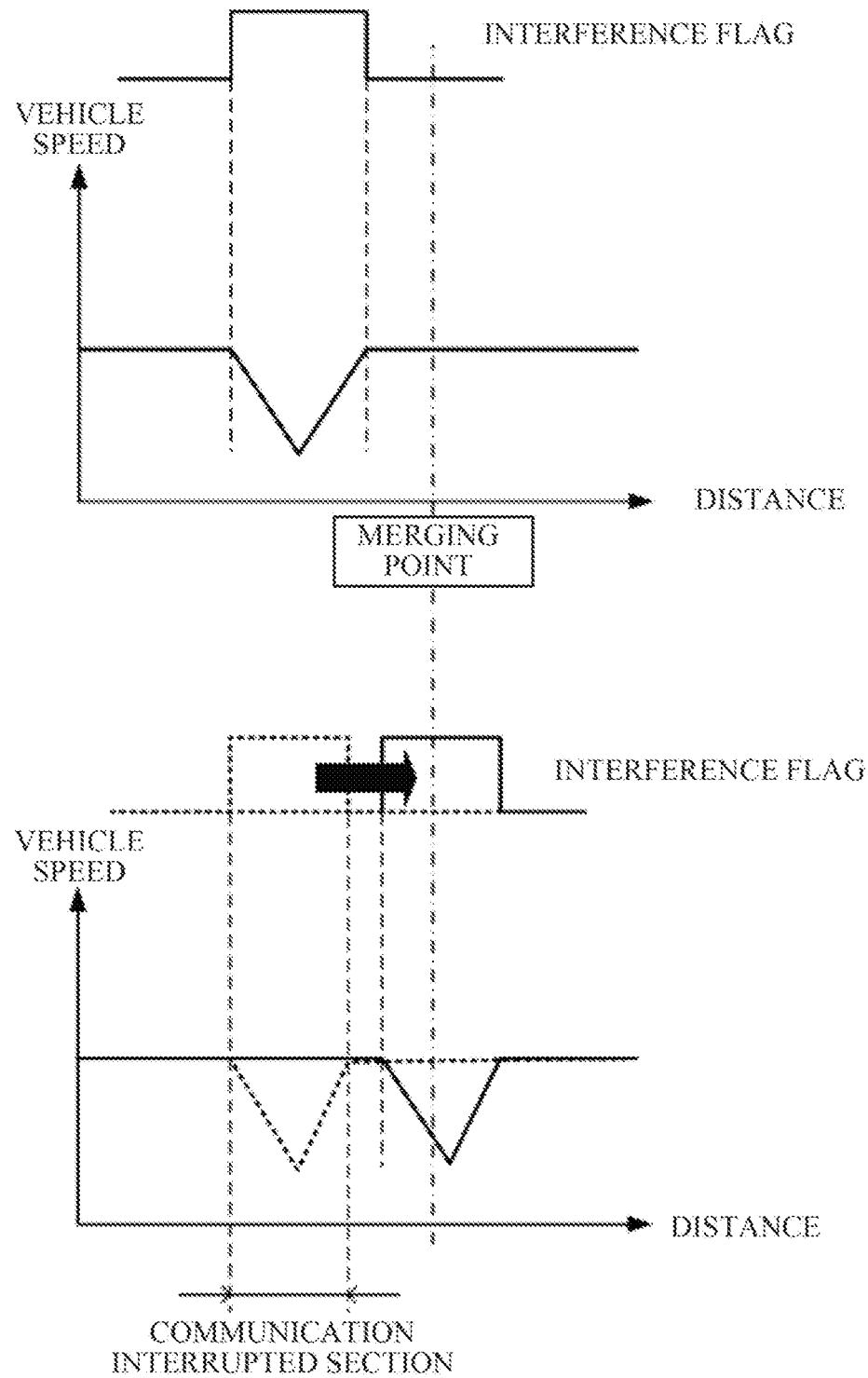
FIG. 7 is a diagram illustrating an example of behavior of communication data in a normal case and in a case where communication is interrupted, according to the example embodiment of the disclosure.

That is, one reason that the processor 550 sends the control signal indicating deceleration to the first vehicle 100 high in communication reliability may be that a timing to send the control signal indicating deceleration to the second vehicle 300 is delayed in the following situation. For example, as illustrated in FIG. 7, the control signal indicating deceleration may be to be sent to the second vehicle 300, but the communication may be interrupted at a timing to send the control signal before the second vehicle 300 reaches the merging point. For example, the communication may recover thereafter, but packet data to be sent at the above-described original timing may remain unsent. In addition, it may take a certain time for the communication to be reestablished. Such a situation may delay the timing to send the control signal indicating deceleration to the second vehicle 300.

In order to avoid the above-described situation, the processor 550 may send the control signal indicating deceleration to the first vehicle 100 high in communication reliability.

[Process to be Performed by Traveling Control Apparatus 500]

Figure 8:
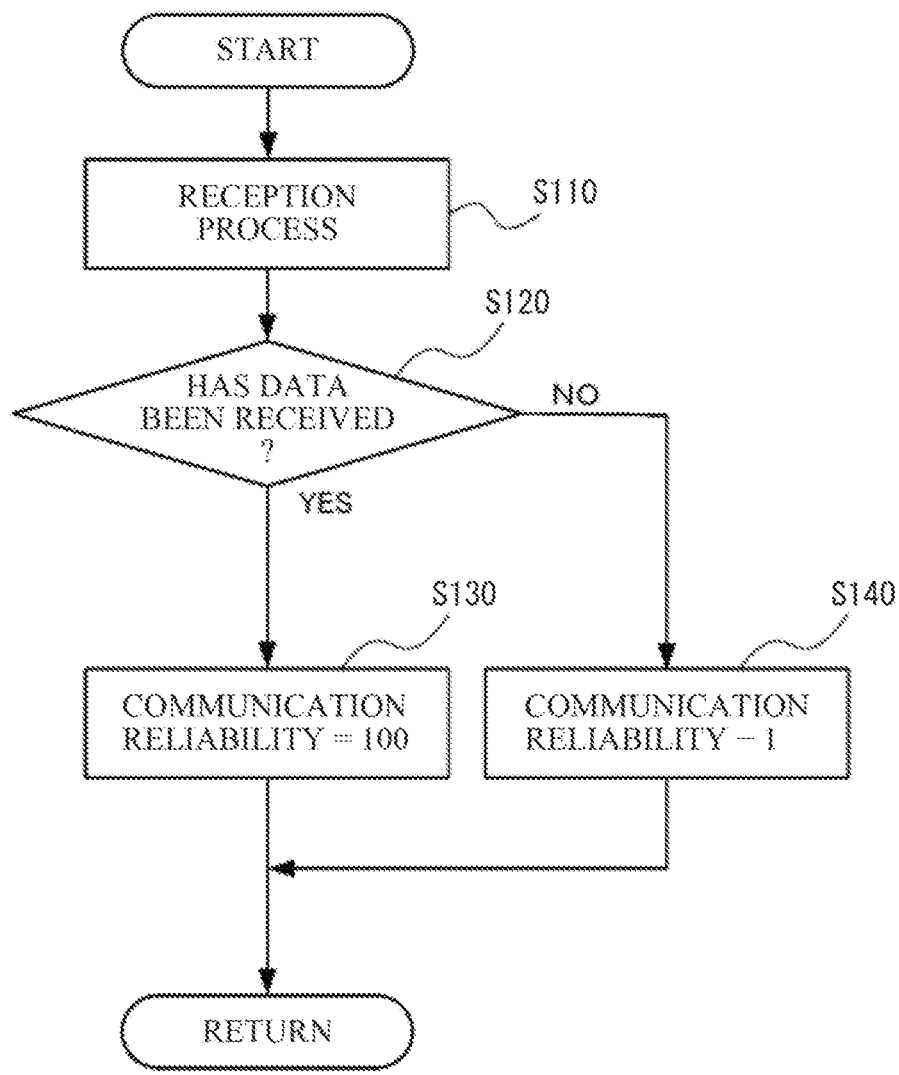
FIG. 8 is a flowchart illustrating a flow of a process to be performed by the traveling control apparatus according to the example embodiment of the disclosure.
Figure 9:
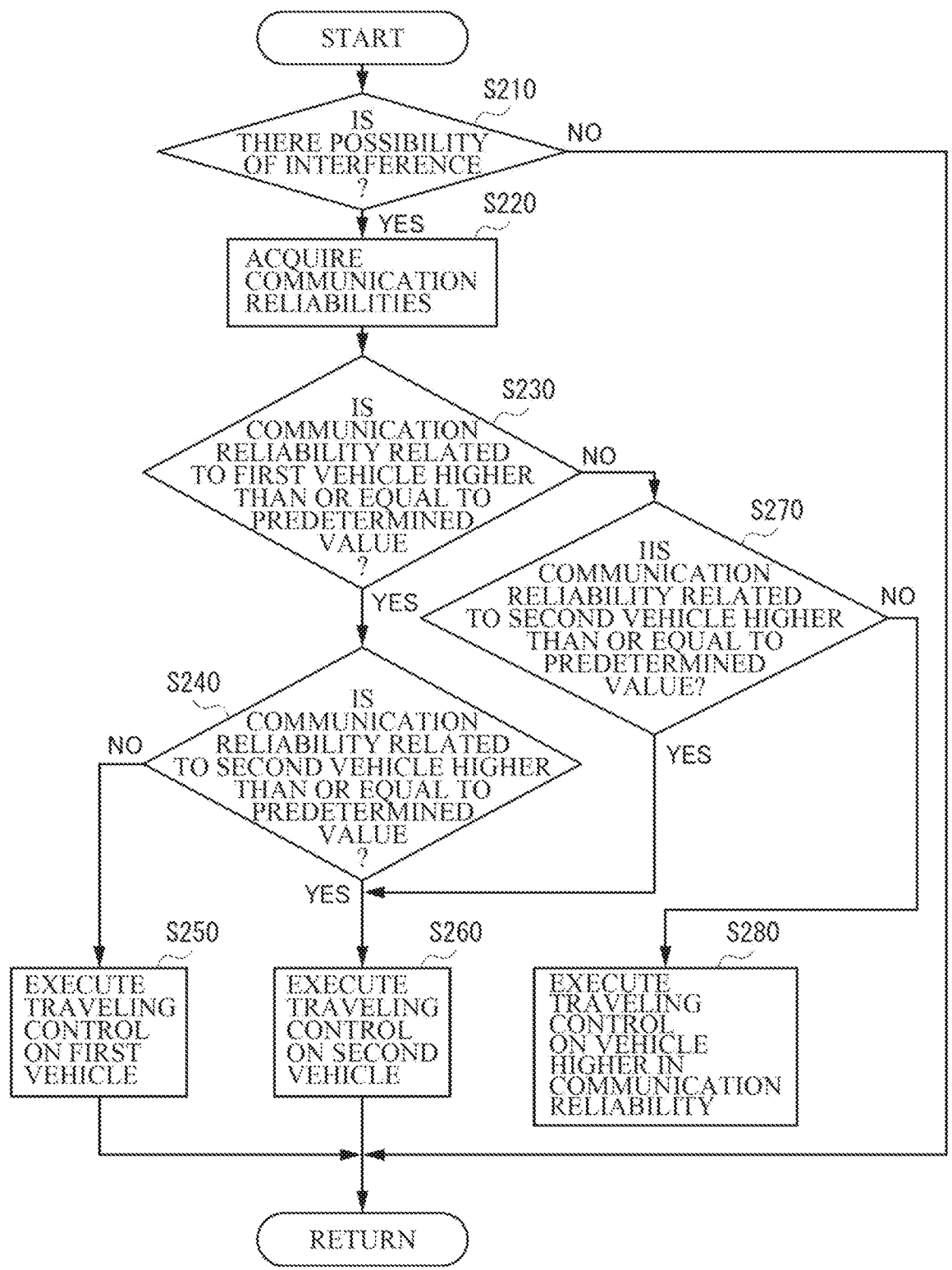
FIG. 9 is a flowchart illustrating a flow of a process to be performed by the traveling control apparatus according to the example embodiment of the disclosure.

A description is provided of a process to be performed by the traveling control apparatus 500 according to the example embodiment with reference to FIGS. 8 and 9.

Before describing a traveling control process to be performed by the traveling control apparatus 500, a communication reliability calculation process to be performed on the first vehicle 100 and the second vehicle 300 will be described with reference to FIG. 8.

[Communication Reliability Calculation Process to be Performed by Traveling Control Apparatus]

As illustrated in FIG. 8, the communicator 510 of the traveling control apparatus 500 may execute a reception process to receive pieces of information from the first vehicle 100 and the second vehicle 300 via the first base station 200 and the second base station 400, respectively (step S110).

The communicator 510 may supply a result of the reception of the information by the communicator 510, to the processor 550 of the traveling control apparatus 500.

The processor 550 of the traveling control apparatus 500 may determine whether data has been received, based on information regarding the result of the reception supplied from the communicator 510 (step S120).

If the processor 550 of the traveling control apparatus 500 determines that the data has been received based on the information regarding the result of the reception supplied from the communicator 510 (step S120: YES), the processor 550 may determine a score of the communication reliability to be 100 (step S130). If the processor 550 of the traveling control apparatus 500 determines that the data has not been received based on the information regarding the result of the reception supplied from the communicator 510 (step S120: NO), the processor 550 may execute a process of subtracting one from the original score of the communication reliability (step S140).

The above-described process may be executed repeatedly at intervals of a first predetermined period of time. For example, the first predetermined time interval may be 100 msec.

[Traveling Control Process to be Performed by Traveling Control Apparatus 500]

As illustrated in FIG. 9, the processor 550 of the traveling control apparatus 500 may determine whether there is a possibility that the first vehicle 100 and the second vehicle 300 interfere with each other at the merging point (step S210).

If the processor 550 of the traveling control apparatus 500 determines that there is no possibility that the first vehicle 100 and the second vehicle 300 interfere with each other at the merging point (step S210: NO), the processor 550 may transition to a standby mode.

If the processor 550 of the traveling control apparatus 500 determines that there is a possibility that the first vehicle 100 and the second vehicle 300 interfere with each other at the merging point (step S210: YES), the processor 550 may acquire information regarding the communication reliabilities from the communication reliability determination unit 520 (step S220).

Thereafter, the processor 550 of the traveling control apparatus 500 may determine whether the communication reliability related to the first vehicle 100, which has a high traveling priority, is higher than or equal to the predetermined value (step S230).

For example, the predetermined value may be a communication reliability in a case where data has not been received for a second predetermined period of time. For example, the second predetermined time may be 2 sec. The predetermined value may be calculated by the following Expression (1).

$$\text{Predetermined value} = 100 - \text{second predetermined period of time}/\text{first predetermined period of time} \quad (1)$$

For example, when the first predetermined period of time, which is the reception process cycle as described above, is 100 msec and the second predetermined period of time is 2 sec, the predetermined value may be 80 based on Expression (1).

When the second predetermined period of time may be set longer than a period of time of disconnection of the communication that may be caused by the handover, and the disconnection of the communication continues for the second predetermined period of time, the disconnection of the communication may not be temporal disconnection caused by the handover and it may be difficult to expect when the communication is reestablished. Therefore, in such a case, the communication reliability may be determined as low.

It is to be noted that a method of determining the communication reliability is not limited to the above-described method. For example, the communication reliability may be determined based on a ratio of a period of time for disconnection of the communication to a predetermined period of time or the number of times of the disconnection of the communication within the predetermined period of time.

If the processor 550 of the traveling control apparatus 500 determines that the communication reliability related to the first vehicle 100, which has the high traveling priority, is higher than or equal to the predetermined value (step S230: YES), the processor 550 of the traveling control apparatus 500 may thereafter determine whether the communication reliability related to the second vehicle 300, which has a low traveling priority, is higher than or equal to the predetermined value (step S240).

If the processor 550 of the traveling control apparatus 500 determines that the communication reliability related to the second vehicle 300, which has the low traveling priority, is higher than or equal to the predetermined value (step S240: YES), the processor 550 may execute, on the second vehicle 300, the traveling control to prevent interference (step S260).

If the processor 550 of the traveling control apparatus 500 determines that the communication reliability related to the second vehicle 300, which has the low traveling priority, is not higher than or equal to the predetermined value, that is, the communication reliability related to the second vehicle 300 is lower than the predetermined value (step S240: NO), the processor 550 may execute, on the first vehicle 100, the traveling control to prevent interference (step S250).

If, in step S230, the processor 550 of the traveling control apparatus 500 determines that the communication reliability related to the first vehicle 100, which has the high traveling priority, is not higher than or equal to the predetermined value, that is, the communication reliability related to the first vehicle 100 is lower than the predetermined value (step S230: NO), the processor 550 of the traveling control apparatus 500 may thereafter determine whether the communication reliability related to the second vehicle 300, which has the low traveling priority, is higher than or equal to the predetermined value (step S270).

If the processor 550 of the traveling control apparatus 500 determines that the communication reliability related to the second vehicle 300, which has the low traveling priority, is higher than or equal to the predetermined value (step S270: YES), the processor 550 may execute, on the second vehicle 300, the traveling control to prevent interference (step S260).

If the processor 550 of the traveling control apparatus 500 determines that the communication reliability related to the second vehicle 300, which has the low traveling priority, is not higher than or equal to the predetermined value, that is, the communication reliability related to the second vehicle 300 is lower than the predetermined value (step S270: NO), the processor 550 may execute the traveling control to prevent interference on one of the first vehicle 100 and the second vehicle 300 that is higher in the communication reliability (step S280).

That is, when both the communication reliability related to the first vehicle 100 and the communication reliability related to the second vehicle 300 are lower than the predetermined value, the processor 550 of the traveling control apparatus 500 may compare the communication reliability related to the first vehicle 100 and the communication reliability related to the second vehicle 300, and may execute the traveling control on one of the first vehicle 100 and the second vehicle 300 that is higher in the communication reliability.

It is to be noted that the above-described series of processes may be repeatedly executed.

[Workings and Example Effects]

As described above, the traveling control apparatus 500 according to the example embodiment is configured to perform the traveling control on the first vehicle 100 or the second vehicle 300 by the wireless communication in the merging section in which the second lane merges into the first lane. The traveling control allows for merging. The first vehicle 100 travels on the first lane. The second vehicle 300 travels on the second lane. The second lane has a lower traveling priority than the first lane. The traveling control apparatus 500 includes the communication reliability determination unit 520 and the processor 550. The communication reliability determination unit 520 is configured to determine the communication reliability related to the first vehicle 100 and the communication reliability related to the second vehicle 300. The communication reliability related to the first vehicle 100 is the communication reliability of the wireless communication between the first vehicle 100 and the traveling control apparatus 500. The communication reliability related to the second vehicle 300 is the communication reliability of the wireless communication between the second vehicle 300 and the traveling control apparatus 500. The processor 550 is configured to perform the traveling control on the second vehicle 300 when both the communication reliability related to the first vehicle 100 and the communication reliability related to the second vehicle 300 are higher than or equal to the predetermined reliability. The processor 550 is configured to perform the traveling control on the first vehicle 100 when the communication reliability related to the first vehicle 100 is higher than or equal to the predetermined reliability and the communication reliability related to the second vehicle 300 is lower than the predetermined reliability. The processor 550 may perform the acceleration suppression control or the deceleration control as the traveling control.

If the deceleration control is executed on a vehicle having a low communication reliability, for example, when communication is disconnected due to a cause such as a malfunction in the communication, it may be highly possible that the deceleration control is prevented from being executed normally. Therefore, when both the communication reliability related to the first vehicle 100 and the communication reliability related to the second vehicle 300 are higher than or equal to the predetermined reliability before the merging section, the traveling control apparatus 500 may execute the acceleration suppression control or the deceleration control as the traveling control on the second vehicle 300. When the communication reliability related to the first vehicle 100 is higher than or equal to the predetermined reliability and the communication reliability related to the second vehicle 300 is lower than the predetermined reliability, the traveling control apparatus 500 may execute the acceleration suppression control or the deceleration control as the traveling control on the first vehicle 100.

This makes it possible to execute the traveling control appropriate for merging also in a situation where the communication quality is deteriorated.

The wireless communication may be performed via base stations. Therefore, the communication reliability determination unit 520 of the traveling control apparatus 500 according to the example embodiment may determine that the communication reliability is lower than the predetermined reliability when the wireless communication is disconnected for a period of time longer than a period of time for handover from one of the base stations to another of the base stations.

In what is called mobile wireless communication to be performed by a communicator mounted in a vehicle, the communication may be performed via multiple base stations, and handover among the base stations may be performed to continue the communication.

Therefore, when the wireless communication is disconnected for a period of time longer than the time for the handover from one of the base stations to another of the base stations, the communication may be interrupted while a control adapted for merging is performed. Accordingly, in such a case, the communication reliability may be determined as being lower than the predetermined reliability.

This makes it possible to execute the traveling control appropriate for merging also in a situation where the communication quality is deteriorated.

The processor 550 of the traveling control apparatus 500 according to the example embodiment may perform the acceleration control or the deceleration control as the traveling control on one of the first vehicle 100 and the second vehicle 300 that is higher in the communication reliability, when both the communication reliability related to the first vehicle 100 and the communication reliability related to the second vehicle 300 are lower than the predetermined reliability.

That is, when both the communication reliability related to the first vehicle 100 and the communication reliability related to the second vehicle 300 are lower than the predetermined reliability, the processor 550 may perform the acceleration control or the deceleration control as the traveling control on the vehicle higher in communication reliability, regardless of the traveling priority.

This makes it possible to execute the traveling control appropriate for the merging also in a situation where the communication quality is deteriorated.

The processor 550 of the traveling control apparatus 500 according to the example embodiment may perform the acceleration control or the deceleration control as the traveling control on one of the first vehicle 100 and the second vehicle 300 that is higher in the communication reliability.

That is, also when both the communication reliability related to the first vehicle 100 and the communication reliability related to the second vehicle 300 are higher than or equal to the predetermined reliability, the processor 550 may perform the acceleration control or the deceleration control as the traveling control on the vehicle higher in the communication reliability, regardless of the traveling priority.

This makes it possible to execute the traveling control appropriate for the merging also in a situation where the communication quality is deteriorated.

In some embodiments, it is possible to implement the traveling control apparatus 500 of the example embodiment of the disclosure by recording the process to be executed by the traveling control apparatus 500 on a non-transitory recording medium readable by a computer system, and causing the computer system to load the program recorded on the non-transitory recording medium onto the traveling control apparatus 500 to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be what is called a differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the communication reliability determination unit 520, the communication processor 530, and the processor 550 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the communication reliability determination unit 520, the communication processor 530, and the processor 550 illustrated in FIG. 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the communication reliability determination unit 520, the communication processor 530, and the processor 550 illustrated in FIG. 4.

The invention claimed is:

1. A traveling control apparatus configured to perform a traveling control on a first vehicle or a second vehicle by wireless communication in a merging section in which a second lane merges into a first lane, the traveling control allowing for merging, the first vehicle traveling on the first lane, the second vehicle traveling on the second lane, the second lane having a lower traveling priority than the first lane, the traveling control apparatus comprising:

a communication reliability determination unit configured to determine communication reliability related to the first vehicle and communication reliability related to the second vehicle, the communication reliability related to the first vehicle being communication reliability of wireless communication between the first vehicle and the traveling control apparatus, the communication reliability related to the second vehicle being communication reliability of wireless communication between the second vehicle and the traveling control apparatus; and a processor configured to perform the traveling control on the second vehicle when both the communication reliability related to the first vehicle and the communication reliability related to the second vehicle are greater than or equal to a predetermined value, the processor being configured to perform the traveling control on the first vehicle when the communication reliability related to the first vehicle is greater than or equal to the predetermined value and the communication reliability related to the second vehicle is less than the predetermined value.

2. The traveling control apparatus according to claim 1, wherein the processor is configured to perform an acceleration suppression control or a deceleration control as the traveling control.

3. The traveling control apparatus according to claim 2, wherein
the wireless communication between the first vehicle and the traveling control apparatus and the wireless communication between the second vehicle and the traveling control apparatus are to be performed via base stations, and
the communication reliability determination unit is configured to determine that the communication reliability related to the first vehicle and the communication reliability related to the second vehicle are less than the predetermined value when the wireless communication is disconnected for a period of time longer than a period of time for handover from one of the base stations to another of the base stations.

4. The traveling control apparatus according to claim 2, wherein the processor is configured to perform, in response to determining that both the communication reliability related to the first vehicle and the communication reliability related to the second vehicle are less than the predetermined value, (i) the traveling control on the first vehicle when the communication reliability related to the first vehicle is greater than the communication reliability related to the second vehicle, and (ii) the traveling control on the second vehicle when the communication reliability related to the second vehicle is greater than the communication reliability related to the first vehicle.

5. The traveling control apparatus according to claim 1, wherein
the wireless communication between the first vehicle and the traveling control apparatus and the wireless communication between the second vehicle and the traveling control apparatus are to be performed via base stations, and
the communication reliability determination unit is configured to determine that the communication reliability related to the first vehicle and the communication reliability related to the second vehicle are less than the predetermined value when the wireless communication is disconnected for a period of time longer than a period of time for handover from one of the base stations to another of the base stations.

6. The traveling control apparatus according to claim 1, wherein the processor is configured to perform, in response to determining that both the communication reliability related to the first vehicle and the communication reliability related to the second vehicle are less than the predetermined value, (i) the traveling control on the first vehicle when the communication reliability related to the first vehicle is greater than the communication reliability related to the second vehicle, and (ii) the traveling control on the second vehicle when the communication reliability related to the second vehicle is greater than the communication reliability related to the first vehicle.

7. A traveling control apparatus configured to perform a traveling control on a first vehicle or a second vehicle by wireless communication in a merging section in which a second lane merges into a first lane, the traveling control allowing for merging, the first vehicle traveling on the first lane, the second vehicle traveling on the second lane, the second lane having a lower traveling priority than the first lane, the traveling control apparatus comprising:
a communication reliability determination unit configured to determine communication reliability related to the first vehicle and communication reliability related to the second vehicle, the communication reliability related to the first vehicle being communication reliability of wireless communication between the first vehicle and the traveling control apparatus, the communication reliability related to the second vehicle being communication reliability of wireless communication between the second vehicle and the traveling control apparatus; and
a processor configured to perform the traveling control on one of the first vehicle and the second vehicle that is greater in communication reliability.

8. A traveling control apparatus configured to perform a traveling control on a first vehicle or a second vehicle by wireless communication in a merging section in which a second lane merges into a first lane, the traveling control allowing for merging, the first vehicle traveling on the first lane, the second vehicle traveling on the second lane, the second lane having a lower traveling priority than the first lane, the traveling control apparatus comprising
circuitry configured to:
determine communication reliability related to the first vehicle and communication reliability related to the second vehicle, the communication reliability related to the first vehicle being communication reliability of wireless communication between the first vehicle and the traveling control apparatus, the communication reliability related to the second vehicle being communication reliability of wireless communication between the second vehicle and the traveling control apparatus; and
perform the traveling control on the second vehicle when both the communication reliability related to the first vehicle and the communication reliability related to the second vehicle are greater than or equal to a predetermined value, and perform the traveling control on the first vehicle when the communication reliability related to the first vehicle is greater than or equal to the predetermined value and the communication reliability related to the second vehicle is less than the predetermined value.

9. The traveling control apparatus according to claim 8, wherein the circuitry is configured to perform an acceleration suppression control or a deceleration control as the traveling control.

10. The traveling control apparatus according to claim 9, wherein
the wireless communication between the first vehicle and the traveling control apparatus and the wireless communication between the second vehicle and the traveling control apparatus are to be performed via base stations, and
the circuitry is configured to determine that the communication reliability related to the first vehicle and the communication reliability related to the second vehicle are less than the predetermined value when the wireless communication is disconnected for a period of time longer than a period of time for handover from one of the base stations to another of the base stations.

11. The traveling control apparatus according to claim 9, wherein the circuitry is configured to perform, in response to determining that both the communication reliability related to the first vehicle and the communication reliability related to the second vehicle are less than the predetermined value, (i) the traveling control on the first vehicle when the communication reliability related to the first vehicle is greater than the communication reliability related to the second vehicle, and (ii) the traveling control on the second vehicle when the communication reliability related to the second vehicle is greater than the communication reliability related to the first vehicle.

12. The traveling control apparatus according to claim 8, wherein
the wireless communication between the first vehicle and the traveling control apparatus and the wireless communication between the second vehicle and the traveling control apparatus are to be performed via base stations, and
the circuitry is configured to determine that the communication reliability related to the first vehicle and the communication reliability related to the second vehicle are less than the predetermined value when the wireless communication is disconnected for a period of time longer than a period of time for handover from one of the base stations to another of the base stations.

13. The traveling control apparatus according to claim 8, wherein the circuitry is configured to perform, in response to determining that both the communication reliability related to the first vehicle and the communication reliability related to the second vehicle are less than the predetermined value, (i) the traveling control on the first vehicle when the communication reliability related to the first vehicle is greater than the communication reliability related to the second vehicle, and (ii) the traveling control on the second vehicle when the communication reliability related to the second vehicle is greater than the communication reliability related to the first vehicle.

14. A traveling control apparatus configured to perform a traveling control on a first vehicle or a second vehicle by wireless communication in a merging section in which a second lane merges into a first lane, the traveling control allowing for merging, the first vehicle traveling on the first lane, the second vehicle traveling on the second lane, the second lane having a lower traveling priority than the first lane, the traveling control apparatus comprising
circuitry configured to:
determine communication reliability related to the first vehicle and communication reliability related to the second vehicle, the communication reliability related to the first vehicle being communication reliability of wireless communication between the first vehicle and the traveling control apparatus, the communication reliability related to the second vehicle being communication reliability of wireless communication between the second vehicle and the traveling control apparatus; and
perform the traveling control on one of the first vehicle and the second vehicle that is greater in communication reliability.

* * * * *